United States Patent [19]
Banks

[11] 3,939,718
[45] Feb. 24, 1976

[54] MECHANISM TO CONVERT ROTARY MOTION TO TRANSVERSE MOTION

[75] Inventor: James W. Banks, Bozman, Md.

[73] Assignee: Chemetron Corporation, Chicago, Ill.

[22] Filed: May 30, 1974

[21] Appl. No.: 474,727

[52] U.S. Cl. .......................... 74/99; 72/77; 72/120
[51] Int. Cl.² ...................................... F16H 21/44
[58] Field of Search ........... 74/99, 126, 128; 72/120

[56] References Cited
UNITED STATES PATENTS

| | | |
|---|---|---|
| 1,218,183 | 3/1917 | Hunker .................................. 72/120 |
| 1,298,656 | 4/1919 | Brinkman .............................. 72/120 |
| 2,377,406 | 6/1945 | Dedrick ................................. 72/120 |
| 3,353,392 | 11/1967 | Anthony et al. ....................... 72/120 |
| 3,429,160 | 2/1969 | Banks ...................................... 72/77 |
| 3,466,918 | 6/1969 | Marcovitch ............................ 72/120 |

*Primary Examiner*—Benjamin W. Wyche
*Assistant Examiner*—Wesley S. Ratliff, Jr.
*Attorney, Agent, or Firm*—N. M. Esser

[57] ABSTRACT

Improved mechanism to convert rotary motion to transverse motion comprises a disc journalled to rotate about its axis and provided eccentrically with a journal, a trunnion provided with a journal, a trunnionway supporting the trunnion for transverse movement of the trunnion within the trunnion-way in opposite directions normal to such axis, and a shaft journalled to rotate within the journal provided in the disc. One end of the shaft is provided eccentrically with an axially extending pin journalled to rotate within the journal provided in the trunnion. Thereby, the pin is displaced transversely as the disc is rotated about its axis.

7 Claims, 5 Drawing Figures

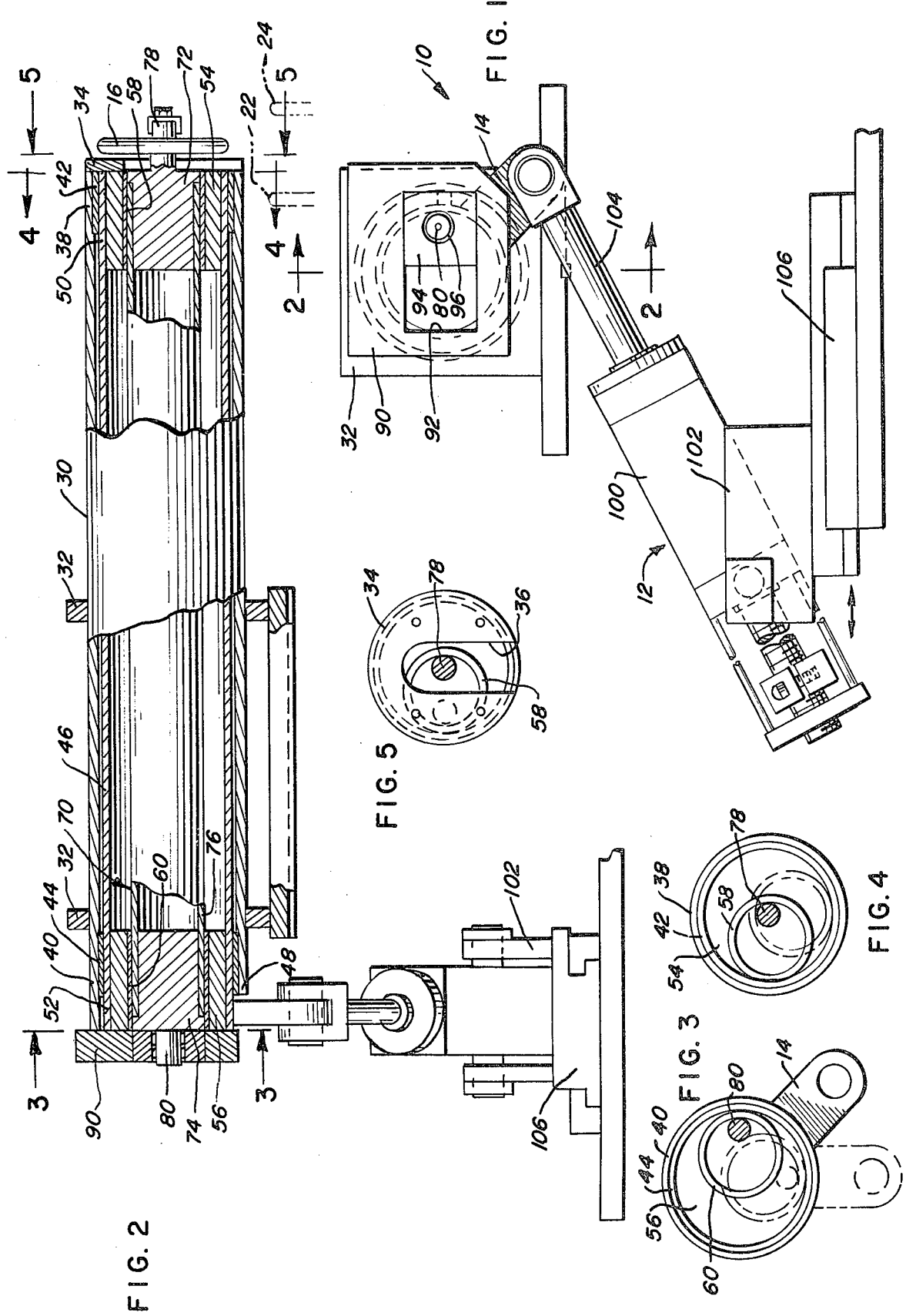

MECHANISM TO CONVERT ROTARY MOTION TO TRANSVERSE MOTION

BACKGROUND OF THE INVENTION

This invention pertains to improved mechanism to convert rotary motion to transverse motion. The mechanism of this invention has particular utility as a component of a bellows forming machine generally of the type described in U.S. Pat. No. 3,429,160, and particularly of the type disclosed in copending application Ser. No. 474,726 concurrently filed and commonly assigned herewith.

In bellows making as commonly practiced in the art, and as described in the aforementioned copending application, the elongated tubular wall of the flexible metal blank to be formed into a bellows having circumferential convolutions (cf. helical convolutions) is deformed, to produce each individual circumferential convolution, between an interior forming roll and conforming exterior forming rolls as the blank is rotated about its axis. The mechanism of this invention can be used advantageously to force the interior forming roll radially outwardly to deform the wall of the blank with minimum deflection of the force transmitting components.

SUMMARY OF THE INVENTION

One object of this invention is to provide improved mechanism to convert rotary motion to transverse motion. Another object of this invention is to provide such mechanism having particular utility as a component of a bellows forming machine.

These objects may be attained in improved mechanism comprising a disc journalled to rotate about its axis and provided eccentrically with a journal, a trunnion provided with a journal, a trunnionway supporting the trunnion for transverse movement of the trunnion within the trunnionway in opposite directions normal to such axis, and a shaft journalled to rotate within the journal provided in the disc. In such mechanism, one end of the shaft is provided eccentrically with an axially extending pin journalled to rotate within the journal provided in the trunnion, whereby the pin is displaced transversely as the disc is rotated about its axis.

To support an interior forming roll in a bellows forming machine, the other end of the shaft may be provided eccentrically with an axially extending pin, the pins being diametrically opposite of the axis of the shaft. Thereby, the pins are displaced transversely in normal directions, and the interior forming roll is displaced transversely, as the disc is rotated about its axis.

To provide a more rugged construction, the mechanism preferably comprises a pair of such discs journalled to rotate about their common central axis, a tube rigidly interconnecting the discs, the shaft being journalled to rotate within the journals provided in the discs. Accordingly, bearing elements may be disposed between the tube and a fixedly supported tube surrounding such tube to permit relative rotation of the tubes.

These objects and other objects, features, and advantages of this invention are evident from the following detailed description of a preferred embodiment of this invention.

BRIEF DESCRIPTION OF THE DRAWINGS

In the drawings:

FIG. 1 is an end elevational view of a mechanism to convert rotary motion to transverse motion;

FIG. 2 is a longitudinal sectional view taken substantially along line 2—2 of FIG. 1 in the direction of the arrows; and FIGS. 3, 4, and 5 are cross-sectional views taken substantially along lines 3—3, 4—4, and 5—5, respectively, of FIG. 2 in the directions of the arrows with certain details omitted for greater clarity.

DETAILED DESCRIPTION OF PREFERRED EMBODIMENT

The drawings illustrate improved mechanism 10 to convert rotary motion to transverse motion. As illustrated, the mechanism 10 is designed to be incorporated into a bellows forming machine of the type disclosed in the aforementioned copending application and is used to convert rotary motion imparted by hydraulic mechanism 12 through a crank or lever 14 to vertical motion of an interior forming roll 16.

The mechanism 10 moves the roll 16 and forces the roll 16 against the elongated tubular wall of a blank to be formed into a bellows having circumferential convolutions to deform such wall. In known manner, the roll 16 cooperates with exterior rolls (phantom outlines 22 and 24) to produce each successive circumferential convolution. Further details of such bellows forming machine are disclosed in the aforementioned copending application. The mechanism 10 also may be adapted to other bellows forming machines such as the machine disclosed in U.S. Pat. No. 3,429,160.

The mechanism 10 comprises a stationary outer tube 30 mounted on upright stanchions 32 constituting a housing supported by the frame of the bellows forming machine. A circular end plate 34 provided with a slot 36 for a purpose to be described below is mounted to one end of the tube 30.

Within the respective end portions 38 and 40 of tube 30 are mounted sleeve bearings 42 and 44. A rotatable inner tube 46 is journalled to rotate within sleeve bearings 42 and 44. A portion of the stationary outer tube 30 is cut away, as indicated at 48, where the crank 14 is attached to the rotatable inner tube 46 for conjoint rotation over a limited angular range (FIGS. 3 and 4).

Within the respective end portions 50 and 52 of the rotatable inner tube 46 are mounted bearing discs 54 and 56. Sleeve bearings 58 and 60 are carried by the respective bearing discs 54 and 56. Sleeve bearing 58 is mounted within an eccentrically located opening 60 in the disc 54. Sleeve bearing 60 is mounted within an eccentrically located opening in the disc 56. As shown in FIGS. 3 and 4, sleeve bearings 58 and 60 are coaxial.

A shaft 70, which as shown comprises shaft portions 72 and 74 at opposite ends and a tubular intermediate portion 76 for weight savings, is journalled to rotate within sleeve bearings 58 and 62. A pin (or stub shaft) 78 extends axially from shaft portion 72. A pin (or stub shaft) 80 extends axially from shaft portion 74. As shown in FIGS. 3 and 4, the pins 78 and 80 are eccentrically located on the respective shaft portions 72 and 74 and are angularly displaced by 180°so as to be on respective diametrically opposite sides of the axis of the shaft 70.

A plate 90 providing a trunnionway 92 is mounted to end portion 40 of the stationary outer tube 30. Slidable trunnion 94 is supported by the trunnionway 92 for transverse movement in opposite directions (FIG. 1) normal to the axis of the tube 30. A rolling needle bearing 96 is mounted in an opening 98 provided in the trunnion 94. The pin 80 is journalled to rotate within the bearing 96.

The pin 78 is free to move within the slot 36 provided in the opposite end plate 34. The interior forming roll 16 is journalled to rotate upon the pin 78.

Hydraulic mechanism 12, which is double-acting, comprises a cylinder 100, which is pivotally mounted on a slider 102, and a rod 104, which is pivotally connected to the crank 14. As the rod 104 is drawn into the cylinder 100, the crank 14 is pivoted in a clockwise sense as shown in FIG. 3. As the rod 104 is drawn out of the cylinder 100, the crank 14 is pivoted in a counterclockwise sense as shown in FIG. 3. The slider 102 is slidable within a slideway 106 mounted to the frame of the bellows forming machine.

As the crank 14 is rotated in either direction by hydraulic mechanism 12, the rotatable inner tube 46 is rotated similarly within the stationary outer tube 30 to cause the shaft 70 to be displaced arcuately. Because the pin 78 is journalled within the trunnion 94, the shaft 70 thus is rotated and the trunnion 94 thus is displaced transversely within the trunnionway 92. Because the pin 80 is diametrically opposite to the pin 78, the pin 80 thus is displaced horizontally together with the trunnion 94 and the pin 78 thus is displaced vertically together with the interior forming roll 16.

The mechanism 10 offers a high mechanical advantage whereby substantial force may be transmitted from hydraulic mechanism 12 through the interior forming roll 16 to deform the elongated tubular wall of a blank to be formed into a bellows having circumferential convolutions. Because of its very rugged construction, the mechanism 10 suffers minimal deflection of the force transmitting components, whereby successive blanks of different thicknesses may be handled without any adjustment being necessary to compensate for such deflection, even though the plane of force application is remote from the plane of force impartation.

I claim:

1. A mechanism for converting rotary motion to transverse motion with high mechanical advantage comprising a housing adapted to be mounted on the frame of a bellows forming machine, an element journalled to rotate about its axis in said housing and provided eccentrically with a journal, a lever extending into said housing and connected to said element, a trunnion provided with a journal, a trunnionway connected to said housing adjacent said lever and supporting said trunnion for transverse linear movement of said trunnion within said trunnionway to said axis, a shaft journalled to rotate within the journal provided in said element, one end of said shaft being provided eccentrically with an axially extending first pin journalled to rotate within the journal provided in said trunnion, said shaft having a mounting means on the other end, forming means rotatably mounted on said mounting means, power means adapted to be mounted on said frame and connected to said lever, whereby said lever rotates said element and therefore moves said shaft and said trunnionway forces said trunnion to move said first pin and therefore rotate said shaft and thereby force said mounting means and said forming means in a linear direction transverse to said axis.

2. The mechanism of claim 1 in which said mounting means is an axially extending second pin, said second pin being equally and oppositely spaced from the centerline of said shaft as said first pin.

3. The mechanism of claim 2 in which said trunnion way extends in a horizontal direction and said first pin therefore moves in said trunnion in a horizontal direction and said second pin moves in a vertical direction.

4. The mechanism of claim 3 in which movement of said lever in one direction causes said second pin to move downwardly and contrary movement of said lever causes said second pin to move upwardly.

5. The mechanism of claim 4 in which said power means is a double acting hydraulic cylinder.

6. The mechanism of claim 5 further comprising first bearing means located between said housing and said element and second bearing means located between said element and said shaft.

7. The mechanism of claim 6 in which said second pin extends outside said housing.

* * * * *

Disclaimer 3,939,718.—*James W. Banks*, Bozman, Md. MECHANISM TO CONVERT ROTARY MOTION TO TRANSVERSE MOTION. Patent dated Feb. 24, 1976. Disclaimer filed Feb. 13, 1978, by the assignee, *Chemetron Corporation*.

Hereby enters this disclaimer to claims 1–7 of said patent.

[*Official Gazette April 18, 1978.*]